(No Model.)
L. F. BETTS.
BROILER FOR OIL OR GAS STOVES.
No. 258,977. Patented June 6, 1882.
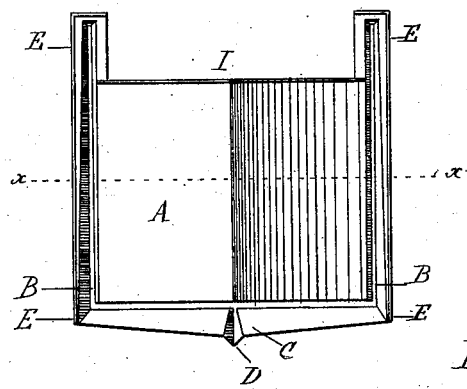
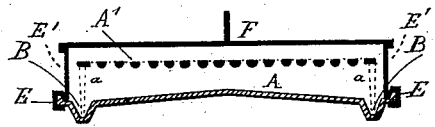
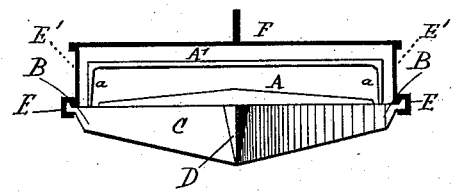
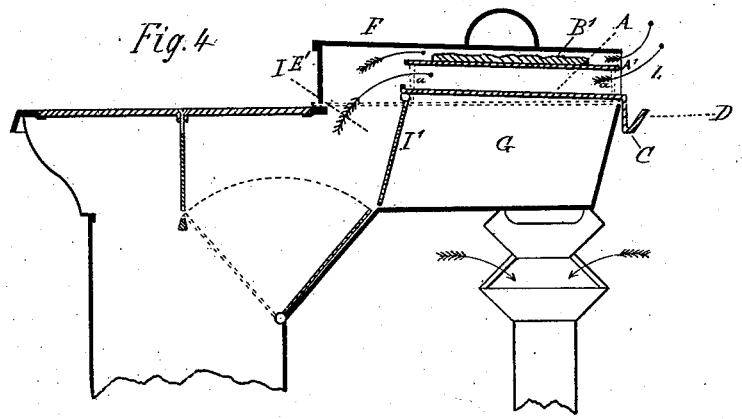
Witnesses —
Wm. A. Lowe
John Buckler
Inventor —
Lewis F. Betts,
By A. M. Pierce,
Atty

UNITED STATES PATENT OFFICE.

LEWIS F. BETTS, OF MORTON, PENNSYLVANIA, ASSIGNOR TO JOHN H. IRWIN, OF SAME PLACE, AND ROBERT E. DIETZ, OF NEW YORK, N. Y.

BROILER FOR OIL OR GAS STOVES.

SPECIFICATION forming part of Letters Patent No. 258,977, dated June 6, 1882.

Application filed March 14, 1882. (No model.)

*To all whom it may concern:*

Be it known that I, LEWIS F. BETTS, of Morton, county of Delaware, and State of Pennsylvania, have invented certain new and useful Improvements in Broilers for Oil or Gas Stoves, (Case 9,) of which the following is a full, clear, and exact description, reference being had to the accompanying drawings, and to the letters of reference marked thereon.

My invention relates especially to cooking utensils employed upon oil or gas stoves, and has for its object the production of a device which shall be cheap and simple to construct, and effective in operation. To accomplish this result my invention consists of a pan constructed of sheet or cast metal, adapted and arranged to fit upon the top of a stove, said pan being provided with a raised center sloping to the right and left, and with suitable channels and receptacles for the juices of the meat, which fall therefrom upon the pan when meat is placed upon a raised gridiron or broiler, the whole device being covered in such a manner as to form a channel for the heated products of combustion, the gridiron or broiler being located therein; and my invention involves certain novel and useful combinations or arrangements of parts and peculiarities of construction and operation, all of which will be hereinafter first fully described, and then pointed out in the claims.

In the drawings, Figure 1 is a plan view of the pan. Fig. 2 is an end elevation thereof, together with the gridiron and cover. Fig. 3 is a vertical sectional view at line *x x* of Fig. 1, together with the cover and gridiron. Fig. 4 is a vertical longitudinal section of my device, shown as mounted upon a stove.

Like letters of reference, wherever they occur, indicate corresponding parts in all the figures.

A is a pan, formed of cast or sheet metal. The center of the pan is raised, as shown, sloping to the right and left.

B are gutters or grooves, located at each side of the pan, passing with a downward inclination to a receptacle, C, formed upon the extremity of the pan, said receptacle being provided with a lip, D, for pouring out its contents.

I' is a plate, hinged to the bottom of the pan, for directing the rising column of heated products of combustion through opening I. The pan is surrounded by a raised edge, E, to which is attached a rim, E', extending around three sides of the pan, the whole being surmounted by a removable cover, F.

A' is a gridiron, having legs *a* fitting into grooves B of pan A. In Fig. 4 a piece of meat, B', is shown as placed thereon, to illustrate the operation of the device.

When the broiler is placed in position upon the top of the stove the grooves B and receptacle C pass down upon the outside of the stove-top G, and when the juices of the meat run into grooves B and receptacle C they are sufficiently removed from the heat of the stove to prevent burning. The heated products of combustion pass from the combustion-chamber of the stove up through opening I, under and over gridiron A', escaping at L, passing upon all sides of the article placed in the receptacle for cooking.

Having now fully described my invention, what I claim as new therein, and desire to secure by Letters Patent, is—

1. A cooking utensil or broiler for use upon oil or gas stoves, having a raised center, gradually sloping to grooves or gutters formed near the edge of a pan and leading to a receptacle at the extremity thereof, in combination with a raised gridiron located above said pan, and a rim attached to the edge of the pan, and extending around three sides thereof, the whole being surmounted by a removable cover, substantially as shown and described.

2. In a cooking utensil or broiler for use upon oil or gas stoves, a pan, A, having a raised center, gradually sloping to grooves or gutters B in the edge of the pan, receptacle C, having lip D, rim E', cover F, and gridiron A', the whole adapted and arranged to fit upon the top of a stove, substantially as shown and described.

3. In a cooking utensil of the character herein specified, the combination, with pan A, having grooves or gutters B, receptacle C, and opening I, of rim E′, gridiron A′, and cover F, adapted and arranged to fit upon rim E′, the pan, rim, and cover forming a conduit for the heated products of combustion, in which the gridiron is located, substantially as shown and described.

In testimony that I claim the foregoing I have hereunto set my hand in the presence of two witnesses.

LEWIS F. BETTS.

Witnesses:
F. W. HANAFORD,
A. M. PIERCE.